United States Patent [19]

Di Pietro et al.

[11] Patent Number: 5,682,074
[45] Date of Patent: Oct. 28, 1997

[54] ELECTRIC VEHICLE MOTOR

[75] Inventors: Carlo C. Di Pietro, Hamilton; Sian S. Lie, Oakville; Nagwa Elkasabgy, Hamilton, all of Canada

[73] Assignee: Northrop Grumman Corporation, Los Angeles, Calif.

[21] Appl. No.: 205,045

[22] Filed: Mar. 2, 1994

[51] Int. Cl.$^6$ .............. H02K 3/34; H02K 15/12; H02K 9/19; H02K 17/16
[52] U.S. Cl. .............. 310/215; 310/45; 310/54; 310/211
[58] Field of Search .............. 310/52, 54, 58, 310/59, 61, 67 R, 83, 215, 211, 42, 45; 180/65.1, 65.5, 65.6, 65.7

[56] References Cited

U.S. PATENT DOCUMENTS

| | | | |
|---|---|---|---|
| 2,003,587 | 6/1935 | Fahlman | 310/211 |
| 2,894,155 | 7/1959 | Labastie | 310/54 |
| 3,092,744 | 6/1963 | Stonebrook | 310/211 |
| 3,531,668 | 9/1970 | Cathey | 310/58 |
| 3,577,024 | 5/1971 | Inagaki et al. | 310/54 |
| 3,609,420 | 9/1971 | Inagaki et al. | 310/54 |
| 3,648,085 | 3/1972 | Fujii | 310/54 |
| 4,160,178 | 7/1979 | Smith et al. | 310/43 |
| 4,289,984 | 9/1981 | Adroshidze et al. | 310/54 |
| 4,362,959 | 12/1982 | Bartheld et al. | 310/64 |
| 4,448,042 | 5/1984 | Yamaguchi et al. | 62/505 |
| 4,473,765 | 9/1984 | Butman, Jr. et al. | 310/215 |
| 4,600,848 | 7/1986 | Sutrina et al. | 310/54 |
| 4,611,137 | 9/1986 | Sutrina | 310/54 |
| 4,644,210 | 2/1987 | Meisner et al. | 310/211 |
| 4,739,204 | 4/1988 | Kitamura et al. | 310/68 D |
| 4,758,758 | 7/1988 | Laing | 310/261 |
| 4,890,050 | 12/1989 | Mackevich | 322/34 |
| 4,959,570 | 9/1990 | Nakamura et al. | 310/54 |
| 5,034,638 | 7/1991 | McCabria | 310/54 |
| 5,043,612 | 8/1991 | Lakin | 310/45 |
| 5,111,090 | 5/1992 | Otake et al. | 310/54 |
| 5,189,325 | 2/1993 | Jarczynski | 310/54 |
| 5,196,746 | 3/1993 | McCabria | 310/54 |
| 5,218,252 | 6/1993 | Iseman et al. | 310/64 |
| 5,363,002 | 11/1994 | Hernden et al. | 310/54 |
| 5,443,130 | 8/1995 | Tanaka et al. | 180/65.6 |

OTHER PUBLICATIONS

A. Petrichenko, I. Gladkii, D. Gluskova and T. Smolyakova; "Plasma Hardfacing of Dies for Copper Alloy Pressure Diecastings"; *Soviet Casting Technology*, No. 8, 1986; pp. 26–27.

R. Ruddle; "Present Status of Non–Ferrous Copper Base Alloy Casting Research in the U.S.A."; *British Foundryman*, vol. 67, Apr., 1974; pp. 95–105.

American Foundrymen's Society; "Casting Copper–Base Alloys"; pp. 42–51.

E. Ford; "Pressure Casting of Slurry Produces Nonporous Parts"; *Die Casting Engineer;* Jan.–Feb., 1990; pp. 18, 20.

"Die Casting Wraps Up Copper Costs"; *Machinery and Production Engineering*, vol. 134, No. 3456; Apr. 11, 1979; pp. 30–32.

H. Barton; "Die Casting Copper–Base Alloys"; *Machinery and Production Engineering*, vol. 123, No. 3175; Sep. 26, 1973; pp. 144–148.

L. Sully, Edison Industrial Systems Center; "Die Casting"; pp. 286–295.

*Primary Examiner*—Clayton E. Laballe
*Attorney, Agent, or Firm*—Walter G. Sutcliff

[57] ABSTRACT

An electric motor for an electrically powered vehicle provides the power necessary for rotating a plurality of vehicle wheels. The motor is constructed of light weight and corrosion resistant metals and includes a cooling system for supplying cooling oil to the rotor and stator core and stator windings such that high speed operation of larger electric motors for electric cars and buses is achievable.

27 Claims, 5 Drawing Sheets

ELECTRIC VEHICLE MOTOR

FIELD OF THE INVENTION

The present invention relates generally to motors for electrically powered vehicles, such as an electric car. More particularly, this invention relates to a light weight and corrosion resistant electric motor having an efficient oil cooling system such that the motor is capable of highly efficient operation over a wide range of speeds.

BACKGROUND OF THE INVENTION

Interest in electric vehicles has grown markedly in the past few decades due to air quality concerns and uncertain petroleum imports. Variable torque and speed control are the essential requirements for power systems in electric vehicles. Several types of electric motors have been used to provide vehicle power requirements. Early traction motors were exclusively dc motors. More recently, advanced ac drive systems have been applied in vehicle power systems using induction motors. These electric vehicles require motors which are small in size, light weight, and inexpensive with high constant power and efficiency.

In view of these requirements, the motor components, primarily the rotor and stator core and the stator windings, are subjected to high temperatures and substantial thermal stresses. Thus, an efficient motor cooling system is necessary to obviate burning of the motor components and to improve the overall electrical and mechanical performance of the motor.

Various design efforts have focused on the development of an electric vehicle having a plurality of smaller electric motors wherein an individual motor is directly coupled to an individual wheel in order to reduce the necessary power requirements for each motor. One such electric vehicle motor is disclosed in U.S. Pat. No. 5,111,090—Otake et al. Otake discloses an oil cooling system for an electric motor which is directly coupled to a single wheel of the vehicle wherein oil is provided from an oil reservoir within the bottom of the motor casing and is pumped upward via an oil path outside of the casing and back into the casing to nozzles located radially outward and directly above the top of coil. The nozzles spray oil directly against the top of the coil and the falling oil is guided into contact with lower portions of the stator core is cooled.

Notwithstanding any advances in the development of smaller electric motors which are individually connected to each wheel of an electric vehicle, there remains a need for light weight and highly efficient electric motors to replace the gas combustion engine and to make electric powered cars capable of maintaining the speeds of gas powered automobiles. The present invention provides an electric motor which satisfies this need.

SUMMARY OF THE INVENTION

An electric motor for an electrically powered vehicle includes a motor casing, a cylindrical rotor core and a rotor shaft extending through the core and rotatably supported by the motor casing. The motor further includes a stator core having a plurality of stator slots and a plurality of windings disposed therein. A motor in accordance with the invention further includes a cooling system for providing a flow of cooling oil onto the rotor and stator components to dissipate the generated heat therefrom and prevent burning of the motor components. The rotor shaft of an electric motor is mechanically coupled to the vehicle drive shaft and provides the power necessary to rotate a plurality of vehicle wheels coupled to the drive shaft. The motor is light weight and corrosion resistant and is capable of providing the power necessary to operate larger vehicles, such as electrically powered passenger cars having 100 hp output and buses having 200 hp output.

BRIEF DESCRIPTION OF THE DRAWINGS

FIG. 3b shows a cut-away of one adjoining pair of the rotor and stator slots shown in FIG. 3a.

FIG. 4b shows a cut-away of a rotor slot shown in FIG. 4a.

DETAILED DESCRIPTION OF THE PREFERRED EMBODIMENTS

Figure 1:
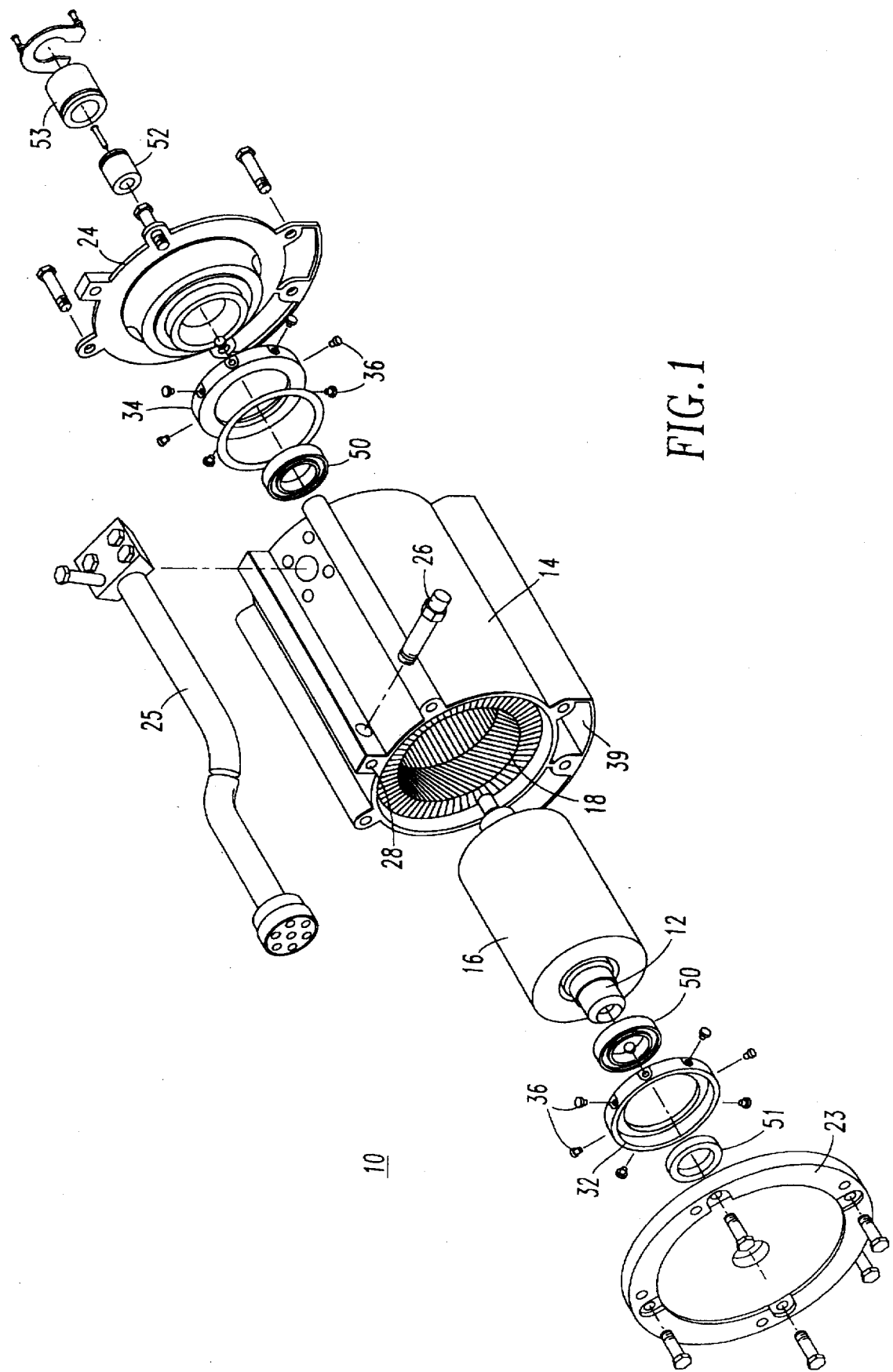
FIG. 1 shows an exploded view of one embodiment of an electric motor in accordance with the present invention.
Figure 2:
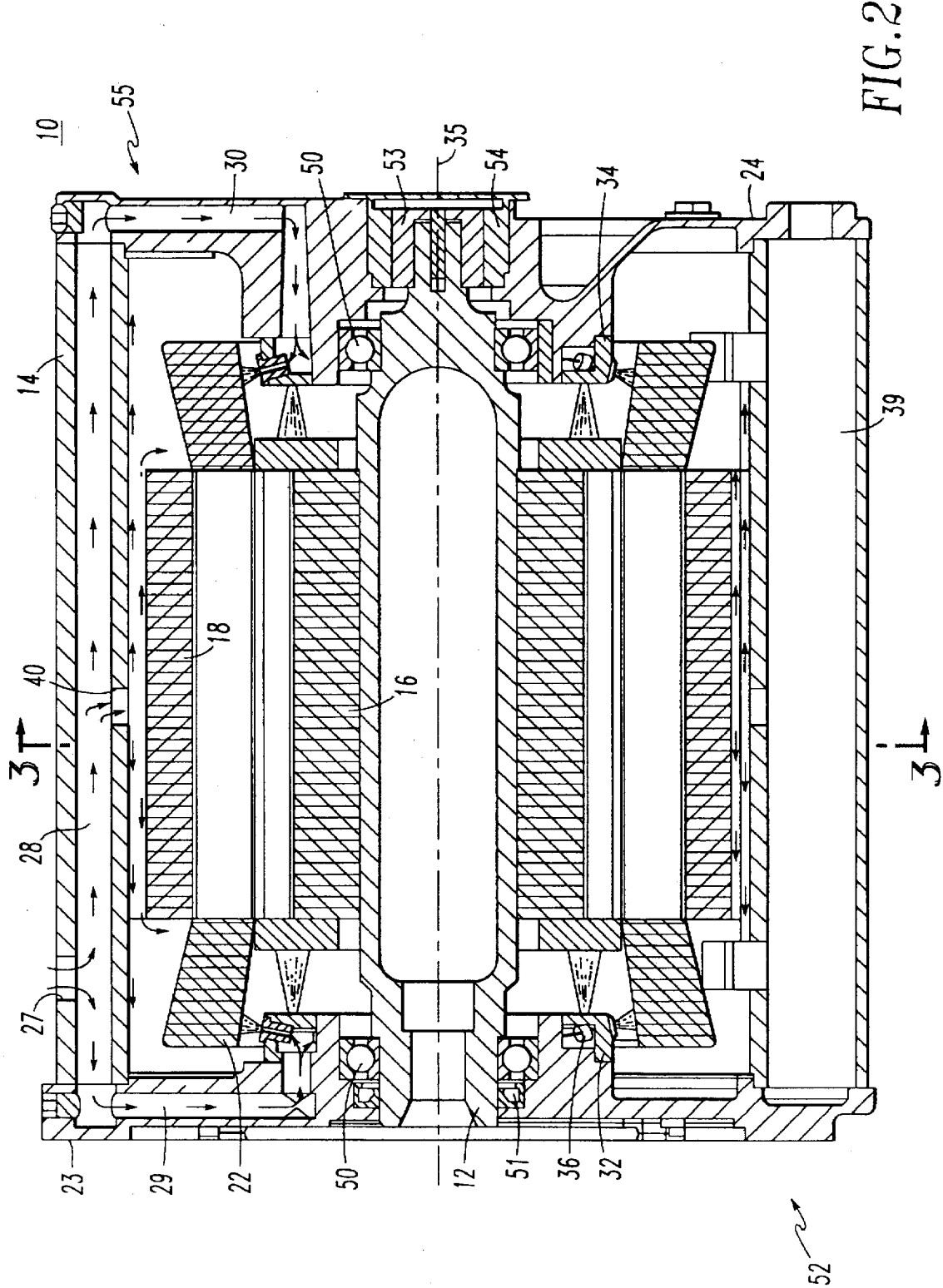
FIG. 2 shows a longitudinal cross-section of an electric motor in accordance an embodiment of the present invention.

FIGS. 1 and 2 show an electric vehicle motor 10 in accordance with the present invention. The motor includes a hollow rotor shaft 12 having two end pieces wherein the shaft is rotatably supported by casing 14. Cylindrical rotor core 16 is fixed to the shaft 12 and stator core 18 is fixed to the casing 14 and disposed around the outer circumference of the rotor core such that a gap is formed between the inner surface of the stator core and the outer surface of the rotor core in a known manner. Stator core 18 has a plurality of stator slots 20 and a plurality of windings 22 disposed in the stator slots 20. End bells 23, 24 are mechanically affixed to the ends of the motor casing for securing the motor components within the casing. The end bells 23, 24 are fixed to the casing ends by a thixotropic seal in a known manner such that O-ring seals are not necessary. Motor 10 further includes cable assembly 25 for providing a supply of electrical power in a known manner.

In order to minimize the adverse effects of the high temperatures on the stator and rotor core, these motor components are provided with cooling oil. Cooling oil 27 is supplied under pressure from a cooling oil supply (not shown), and enters the casing 14 through oil inlet adapter 26. Oil flows into channel 28 in the casing, the channel preferably extending longitudinally along the length of the top of the casing. Oil flows along channel 28 and into end bell channels 29, 30 in end bells 23, 24 respectively.

Oil spray nozzle retainers 32, 34 are mechanically affixed to end bells 23, 24 respectively such that the oil spray nozzle retainers are in flow communication with the cooling oil 27 flowing through end bell channels 29, 30. Each oil spray nozzle retainer 32, 34 contains a plurality of nozzles 36 disposed therein for spraying cooling oil 27 onto the motor components. In a preferred embodiment, oil spray nozzle retainers 32, 34 are ring-shaped such that rotor shaft 12 extends through the retainers. Thus, the rotor and stator cores 16, 18 and the oil spray nozzle retainers 32, 34 all have a coincidental central longitudinal axis 35.

In a preferred embodiment, nine nozzles 36 are equally spaced circumferentially around each of the oil spray nozzle retainer rings. These nine nozzles are positioned at an angle relative to the central longitudinal axis 35 to spray cooling oil directly onto the longitudinal ends of the stator core 18 and windings 22. Thus, cooling oil is evenly sprayed around the entire 360 degrees of the outer ends of the stator core and windings. Heat from the longitudinal center of these components will dissipate toward the cooler ends such that the entire stator is cooled efficiently. Two additional nozzles 36 per each retainer ring are positioned to spray cooling oil directly onto the longitudinal ends of the rotor core 16 for cooling the rotor core in a similar manner to that described for the stator core. In a preferred embodiment, nozzles 36 spray cooling oil as a mist having a cone shape, as shown in FIG. 2, for distributing oil to a maximum surface area of the stator and rotor ends. Excess cooling oil is collected in reservoir 39 and pumped out of the motor for filtering and reuse.

Figure 3A:
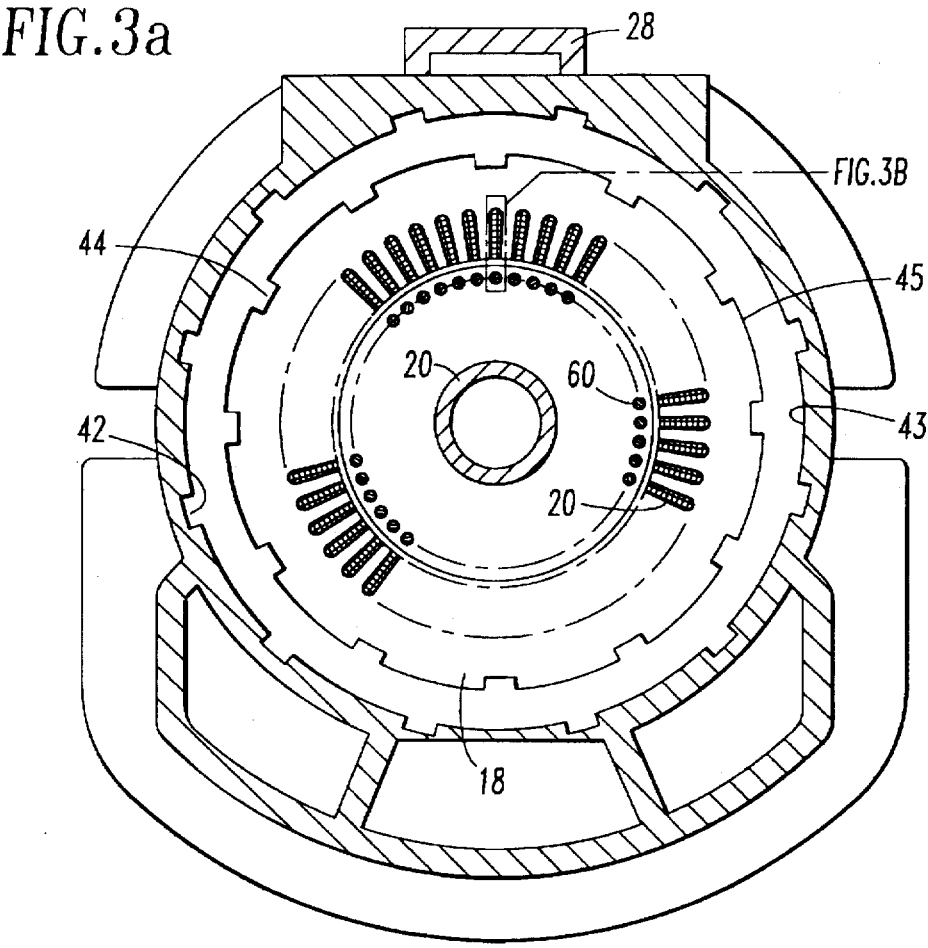
FIG. 3a shows a lateral cross-section of an electric motor in accordance the embodiment shown in FIG. 2 taken along the lines 3—3.

Cooling oil 27 can also be supplied under pressure through a central aperture 40 which is disposed around the circumference of the casing 14 where the stator core 18 is fixed to the casing, as shown in FIG. 2. Referring to FIG. 3a, casing grooves 42 are cut into and extend longitudinally along the length of an inner surface 43 of the casing 14. A plurality of casing grooves 42 are disposed around the circumference of inner surface 43. Stator grooves 44 are cut into and extend longitudinally along the length of an outer surface 45 of the stator core 18. A plurality of stator grooves 44 are disposed around the circumference of outer surface 45. It should be noted that the outer surface 45 of the stator core is fixed to the inner surface 43 of the casing, however, these two surfaces are shown as separated in FIG. 3a for clarity. Casing grooves 42 and stator grooves 44 are alternatingly positioned around the circumference of inner surface 43 and outer surface 45 respectively, such that a casing groove is adjacent a corresponding stator groove. Referring again to FIG. 2, cooling oil 27 flows from channel 28, into aperture 40 and around the circumference of the outer surface of the stator core, and along the length of casing grooves 42 and stator grooves 44 such that cooling oil is distributed evenly over the outer surface 45 of the stator core. Thus, oil is provided directly for cooling around the entire circumference and along the entire length of the stator core. Cooling oil that flows over the longitudinal ends of the stator core flows onto the windings 22 to cool the windings.

Depending on the application and the size of the motor, the oil spray nozzle retainer arrangement discussed above can be used in combination with the longitudinal groove cooling arrangement just discussed. Thus, the present invention provides an efficient cooling system for electric car motors, i.e those capable of producing about 100 hp, as well as longer and larger motors, such as those for an electrically powered bus capable of 200 hP or higher, where the temperatures within the rotor and stator cores are at the highest levels. For smaller motors, where temperatures within the rotor and stator core are less extreme, either the oil spray nozzle retainer arrangement or the longitudinal groove arrangement can be used independently to provide adequate cooling of the motor components.

Referring once again to FIGS. 1 and 2, a portion of the cooling oil sprayed by nozzles 36 of the first and second oil spray nozzle retainers 32, 34 is also distributed on ball bearings 50 disposed on the rotor shaft 12. Thus, the present invention also provides effective lubrication of the ball bearings. A high temperature carbon-graphite seal 51 prevents oil leakage out of end bell 23 at the drive end 52 of the motor. Resolver rotor 53 and resolver stator 54 are also constructed to seal the non-drive end 55 of the motor at end bell 24 to prevent leakage of oil.

In a preferred embodiment, casing 12 comprises magnesium which is extruded to form the casing shape. Also in a preferred embodiment, end bells 23, 24 comprise a magnesium alloy, preferably comprising about 90% magnesium. In a most preferred embodiment, end bells 23, 24 comprise the magnesium alloy sold commercially as Magnesium AZ91D by Northern Diecast of Harbor Springs, Mich. Thus, the present invention provides an electric motor with significantly high horse-power which is light in weight and highly corrosion resistant.

In a preferred embodiment, rotor core 16 and stator core 18 are formed of a plurality of thin, insulated sheets of metal, or laminations, stacked and pressed together. Preferably, these laminations comprise a silicon steel alloy.

Figure 3B:
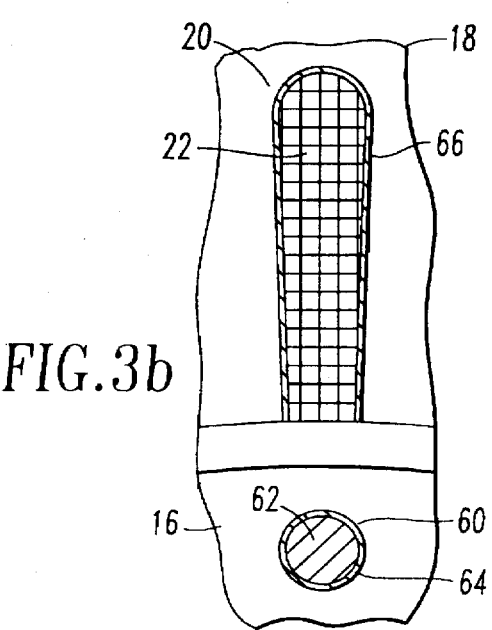

As shown in FIGS. 3a and 3b, rotor core 16 has a plurality of rotor slots 60 located around the periphery of the rotor core proximate the outer surface. Stator core 18 also has a plurality of stator slots 20 which open onto the inner surface of the annular stator core. As set forth above, electrical windings 22 are disposed in the stator slots 20.

In order to provide a path for the flow of electricity through the rotor, a conducting metal 62 is provided to fill the rotor slots 60. Preferably, conducting metal 62 comprises copper or aluminum, with copper being most preferred. Rotor slots 60 can be filled by a known die cast process, in which molten metal is cast into the rotor slots. However, due to the high melting point of copper, the temperature experienced by the rotor laminations at the rotor slots during the die cast process may be greater than 1150° F.

The adverse effects of the die casting process on the rotor laminations include degradation of the steel alloy laminations caused by the relatively high temperature necessary to maintain the conducting metal in a molten state, oxidation, and over-heating of the rotor core resulting in damage to the insulation between the stacked laminations. In order to protect the rotor laminations from the adverse effects of the die cast process, this invention provides that a rotor slot coating 64 is deposited onto the surface of the rotor slots 60, prior to die casting. Such a coating is chosen to have a high dielectric strength, low heat conductivity, high resistance to the action of chemicals and high strength. Since rotor slot coating 64 has a high dielectric strength, the coating provides an insulating layer between the conducting metal in the rotor slots and the rotor core laminations.

A stator slot coating 66 of similar characteristics is likewise deposited onto the surface of the stator slots 20. Such a coating has a high dielectric strength and provides a layer of insulation between the stator core laminations and the conducting metal in the windings of the stator slots. Preferably, stator slot coating 66 is the same as rotor slot coating 64.

In a preferred embodiment, rotor slot coating 64 and stator slot coating 66 both comprise a ceramic-based material. For the present invention, the phrase ceramic-based materials refers to materials with a matrix having ceramic material as its principal component. The ceramic material may be silicon or germanium, with silicon being the preferred ceramic material. However, the present invention is not intended to be limited in this manner and any available ceramic materials which possess the above described characteristics are within the scope of the present invention.

In a preferred embodiment, rotor slot coating 64 and stator slot coating 66 comprise silicon and aluminum. The value of the dielectric strength for this coating is about 300 V/mils. In a most preferred embodiment, the rotor and stator slot coatings comprise about 94.5 percent silicon and about 5.5 percent aluminum. This composition has a melting point of about 2903° F., which is the lowest melting point for a composition of silicon and aluminum. Since the melting point of this composition of silicon and aluminum is well in excess of the temperatures experienced during a copper die cast process, this coating provides the desired protection for the rotor and/or stator core laminations. In another embodiment of the present invention, rotor slot coating 64 and stator slot coating 66 comprise a composition of silicon, aluminum and between 2 to 3 percent titanium.

Figure 4B:
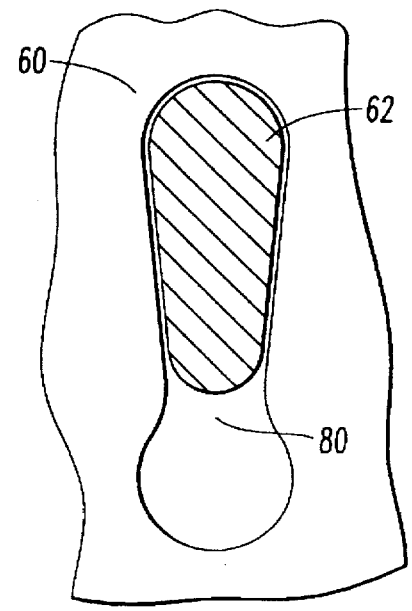
Figure 4A:
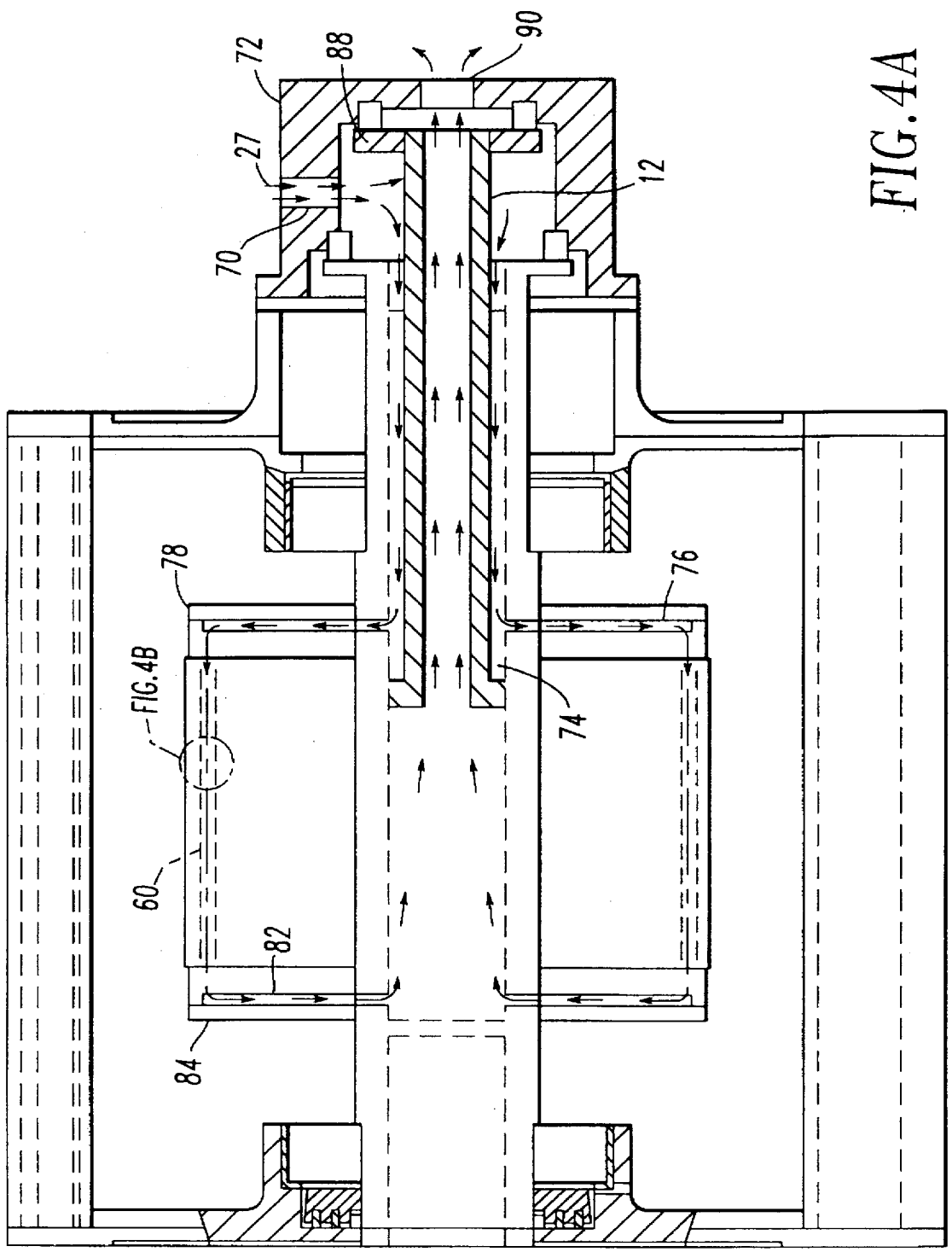
FIG. 4a shows a longitudinal cross-section of an electric motor in accordance with a further embodiment of the present invention.

A further embodiment of the present invention is shown in FIGS. 4a and 4b, wherein cooling oil is supplied within the rotor core 16. Cooling oil 27 enters the motor under pressure through passage 70 in manifold 72 mounted on the non-drive end of the motor. Manifold 72 distributes the cooling oil radially about the outer surface of the rotor shaft 12. Oil flows axially along an annular rotor channel 74 formed in the rotor shaft. Oil subsequently flows along a plurality of radial passages 76 formed between an end of the rotor core and resistance ring 78 affixed to the rotor core. Radial passages 76 are provided such that one radial passage is in flow communication with a corresponding one of the rotor slots 60. Referring to FIG. 4b, rotor slots 60 further comprise axial rotor slot channels 80 such that the rotor slot channels are in flow communication with radial passages 76. Oil flows axially along the rotor slot channels to cool the conducting metal 62 disposed in the rotor slots. Oil then flows out of the rotor slot channels, into a plurality of corresponding radial passages 82 formed between the other end of the rotor core and resistance ring 84 affixed to the rotor core, and into the hollow center of the rotor shaft 12. Oil flowing through rotor shaft cools the shaft tube and ball bearings 88 and flows out of the manifold through outlet 90 where it can be filtered and reused.

Figure 5:
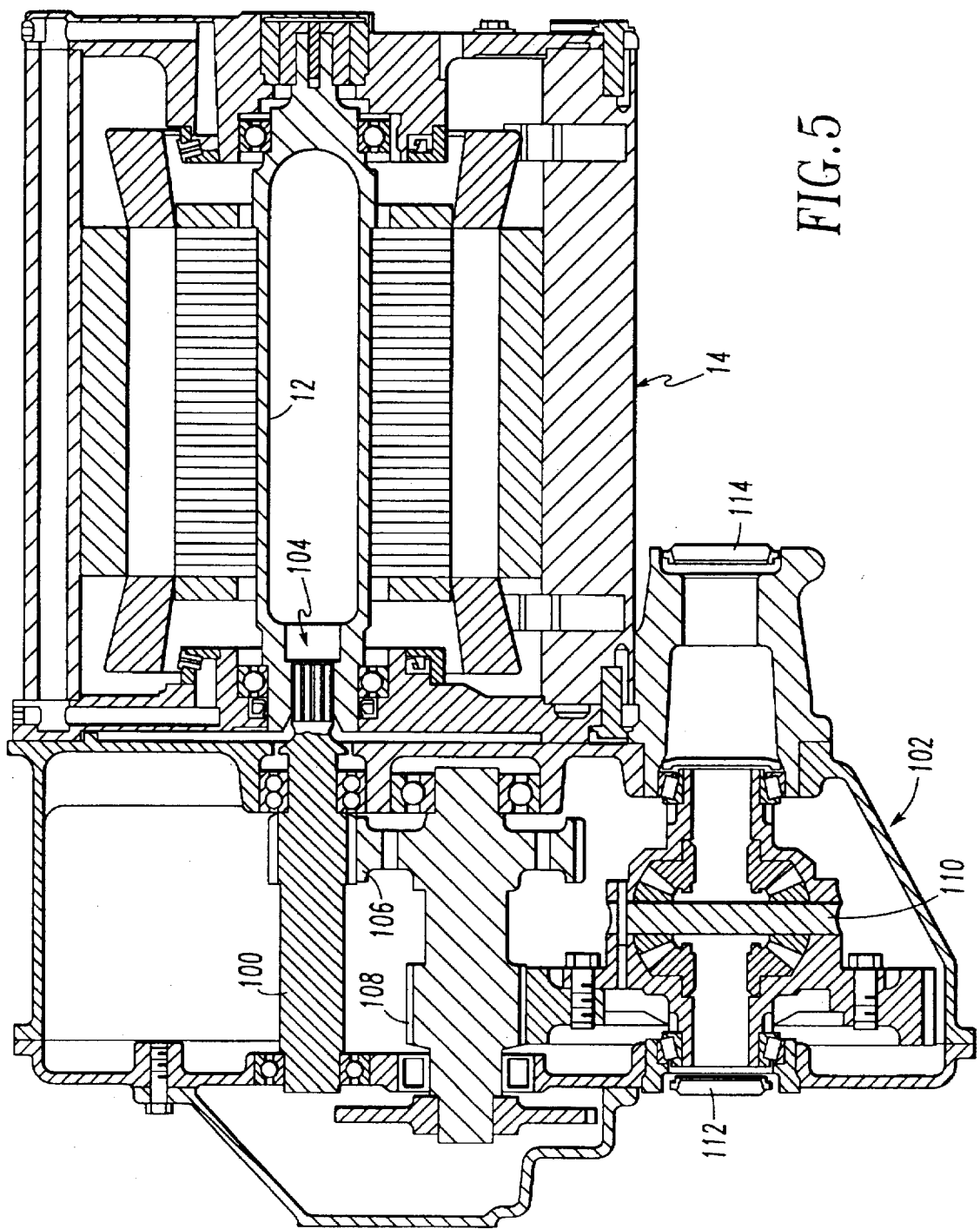
FIG. 5 shows a longitudinal cross-section of a vehicle drive system in accordance with the present invention.

A vehicle drive system including an electric motor in accordance with the present invention is shown in FIG. 5. Rotor shaft 12 is rotatably coupled to drive shaft 100 housed in gear box casing 102. Drive shaft 100 is coupled to rotor shaft 12 by a splined coupling 104 which is commonly known in the art. Drive shaft 100 actuates gear mechanism 106 which, in turn, actuates gear mechanism 108 for operating differential 110 in a known manner. Differential 110 is mechanically coupled to axles 112, 114 for rotating the axles which, in turn, rotate the vehicle wheels in a known manner.

Although particular embodiments of the present invention have been described and illustrated herein, it is recognized that modifications and variations may readily occur to those skilled in the art. Consequently, it is intended that the claims be intended to cover such modifications and equivalents.

We claim:

1. An oil-cooled electric motor for a vehicle, comprising:
a motor casing having first and second casing ends;
a rotor having a cylindrical laminated rotor core including a plurality of laminations and intervening insulation and a rotor shaft extending through said rotor core, said rotor shaft rotatably supported by said motor casing;
a laminated stator core including a plurality of laminations and intervening insulation and having a plurality of stator slots formed therein and a plurality of windings disposed in said stator slots, said stator core disposed around said rotor, said stator core having first and second stator ends;
a first oil spray nozzle retainer disposed proximate said first stator end and a second oil spray nozzle retainer disposed proximate said second stator end, each said first and second oil spray nozzle retainers having a plurality of nozzles disposed therein, said nozzles in flow communication with a supply of cooling oil for spraying cooling oil onto said first and second stator end; and
wherein said rotor core includes a plurality of rotor slots having a cast conducting metal disposed therein, said rotor further having a rotor slot electrical insulating coating that is thermally resistant to the passage of heat, deposited onto a rotor slot surface of each said rotor slot, said electrical insulating coating being disposed between said cast conducting metal and said rotor slot surface prior to said cast conducting metal being disposed in each said rotor slot during a die casting process to protect the laminations of said rotor core from the adverse heating effects of said die casting process.

2. The motor of claim 1 wherein said rotor slot electrical insulating coating comprises a ceramic-based material.

3. The motor of claim 2, wherein the principal component of said ceramic-based material is selected from the group consisting of silicon and germanium.

4. The motor of claim 2 wherein said rotor slot electrical insulating coating is comprised of silicon and aluminum.

5. The motor of claim 2 wherein said rotor slot electrical insulating coating is comprised of about 94.5 percent silicon and about 5.5 percent aluminum.

6. The motor of claim 2 wherein said rotor slot electrical insulating coating comprises a composition of silicon, aluminum and titanium.

7. The motor of claim 6 wherein the proportion of titanium in said composition is about 2 to 3 percent.

8. The motor of claim 1, wherein said cast conducting metal is copper.

9. The motor of claim 1, wherein said cast conducting metal is aluminum.

10. An electric motor for a vehicle, comprising:
a motor casing having first and second casing ends;
a rotor having a laminated rotor core including a plurality of laminations and intervening insulation and a rotor shaft extending through said rotor core, said rotor shaft rotatably supported by said motor casing;
a laminated stator core including a plurality of laminations and intervening insulation having a plurality of stator slots formed therein and a plurality of windings disposed in said stator slots, said stator core being disposed around said rotor; and
wherein said rotor core includes a set of rotor slots having a cast conducting metal disposed therein by a die casting process and having a rotor slot electrical insulating coating which is thermally resistant to the passage of heat, deposited on a surface of said rotor slots prior to said die casting process to protect the laminations and insulation from the adverse heating effects of the die casting process including the relatively high temperature necessary to maintain the cast conducting metal in a molten state during said die casting process as well as the effects of oxidation and over heating of said rotor core which results in damage to the intervening insulation.

11. The motor of claim 10 wherein said rotor slot electrical insulating coating comprises a ceramic-based material having a melting point which is greater than the melting point of said conducting metal.

12. The motor of claim 11 wherein said cast conducting metal is comprised of copper or aluminum.

13. The motor of claim 11 wherein said ceramic-based material is silicon or germanium.

14. The motor of claim 11 wherein said rotor slot electrical insulating coating is comprised of silicon and aluminum.

15. The motor of claim 11 wherein said coating is comprised of about 94.5 percent silicon and of about 5.5 percent aluminum.

16. The motor of claim 11 wherein said coating is comprised of a composition of silicon, aluminum, and titanium.

17. The motor of claim 16 wherein the proportion of titanium in said composition is between 2 and 3 percent.

18. The motor of claim 11 wherein said melting point of said ceramic based material is at least 2900° F.

19. The motor of claim 11 wherein ceramic based material has a dielectric strength of at least 300 V/mils.

20. The motor of claim 10 and wherein said stator core includes a set of stator slots having a stator slot electrical insulating coating on a surface of said rotor slots like said rotor slots and having cast conducting metal formed over said stator slot electrical insulating coating.

21. The motor of claim 20 wherein said rotor slot electrical insulating coating and said stator slot electrical insulating coating are comprised of the same electrical insulating coating material.

22. The motor of claim 21 wherein said electrical insulating coating material comprises a ceramic-based material.

23. The motor of claim 22 wherein said ceramic based material comprises silicon or germanium.

24. The motor of claim 21 wherein said electrical insulating coating material comprises a composition of silicon and aluminum.

25. The motor of claim 21 wherein said electrical insulating coating material comprises a composition of about 94.5 percent silicon and of about 5.5 percent aluminum.

26. The motor of claim 21 wherein said electrical insulating coating material is comprised of a composition of silicon, aluminum and titanium.

27. The motor of claim 26 wherein the proportion of titanium in said composition is between 2 and 3 percent.

* * * * *